United States Patent
Liao et al.

(10) Patent No.: US 9,434,315 B2
(45) Date of Patent: Sep. 6, 2016

(54) DRIVING ASSISTANCE DEVICE IN VEHICLE FOR RECEIVING ELECTRONIC DEVICE

(71) Applicant: HON HAI PRECISION INDUSTRY CO., LTD., New Taipei (TW)

(72) Inventors: Kuang-Yao Liao, New Taipei (TW); Chih-Chao Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 57 days.

(21) Appl. No.: 14/311,589

(22) Filed: Jun. 23, 2014

(65) Prior Publication Data

US 2014/0375075 A1 Dec. 25, 2014

(30) Foreign Application Priority Data

Jun. 24, 2013 (TW) .............................. 102122358 A (51) Int. Cl.
*B60R 1/00* (2006.01)
*B60R 1/12* (2006.01)

(52) U.S. Cl.
CPC .......... *B60R 1/12* (2013.01); *B60R 2001/1284* (2013.01)

(58) Field of Classification Search
CPC .... B60R 1/12; B60R 2001/1284; H05K 5/02
USPC .............................. 361/679.01, 728; 715/700
See application file for complete search history.

(56) References Cited

U.S. PATENT DOCUMENTS

2008/0077882 A1* 3/2008 Kramer .................. B60K 35/00
715/810

* cited by examiner

Primary Examiner — Joseph D Pape
(74) Attorney, Agent, or Firm — Zhingang Ma (57) ABSTRACT

A driving assistance device to accommodate, and communicate with, a portable device includes a housing, a plug connector, a controller and an ejection member. The housing defines a receiving chamber therein and an end opening communicating with the receiving chamber. The housing includes a bulkhead assembled in the receiving chamber to divide the receiving chamber into a first receiving portion and a second receiving portion, the first receiving portion communicates with the opening. The plug connector is assembled to the bulkhead and aligned to the opening. The controller is received in the second receiving portion and electrically coupled to the plug connector. The ejection member can be operated to eject the portable device.

11 Claims, 7 Drawing Sheets

DRIVING ASSISTANCE DEVICE IN VEHICLE FOR RECEIVING ELECTRONIC DEVICE

FIELD

The present disclosure generally relates to driving enhancement and safety.

BACKGROUND

Vehicles can be equipped with a plurality of assistance devices, such as driving monitors and portable navigation devices.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The term "coupled" is defined as coupled, whether directly or indirectly through intervening components, and is not necessarily limited to physical connections. The connection can be such that the objects are permanently coupled or releasably coupled. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder.

Figure 1:
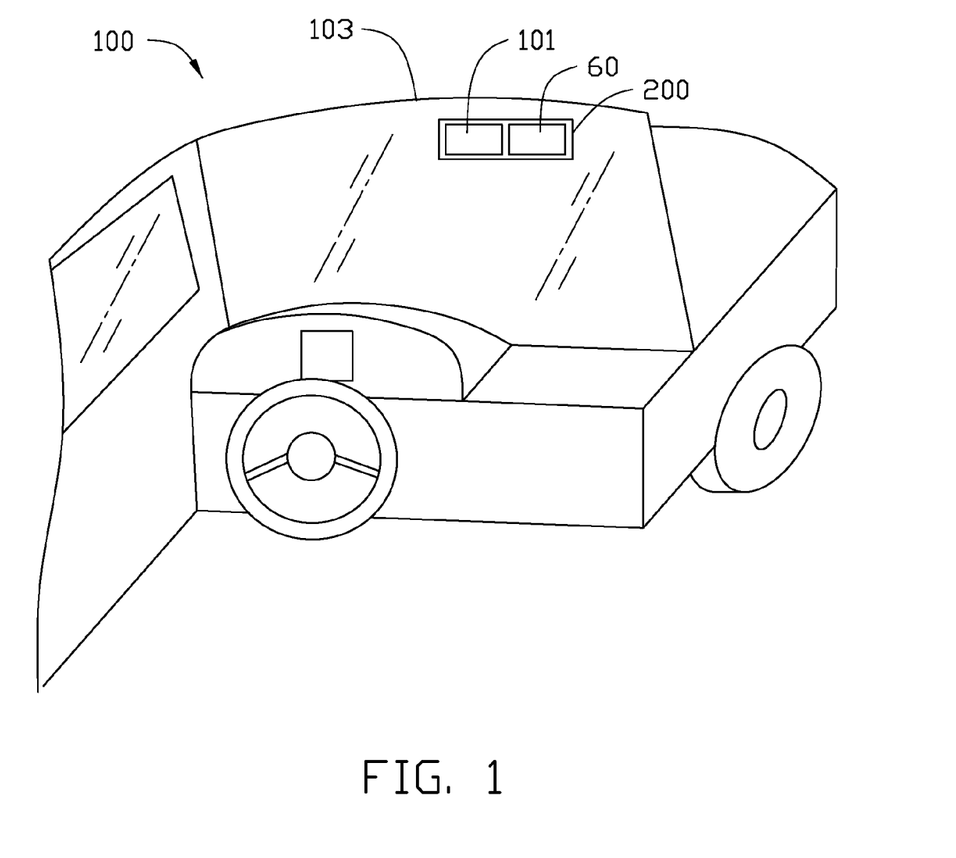
FIG. 1 shows a partial view of an embodiment of a vehicle, including a driving assistance device.
Figure 2:
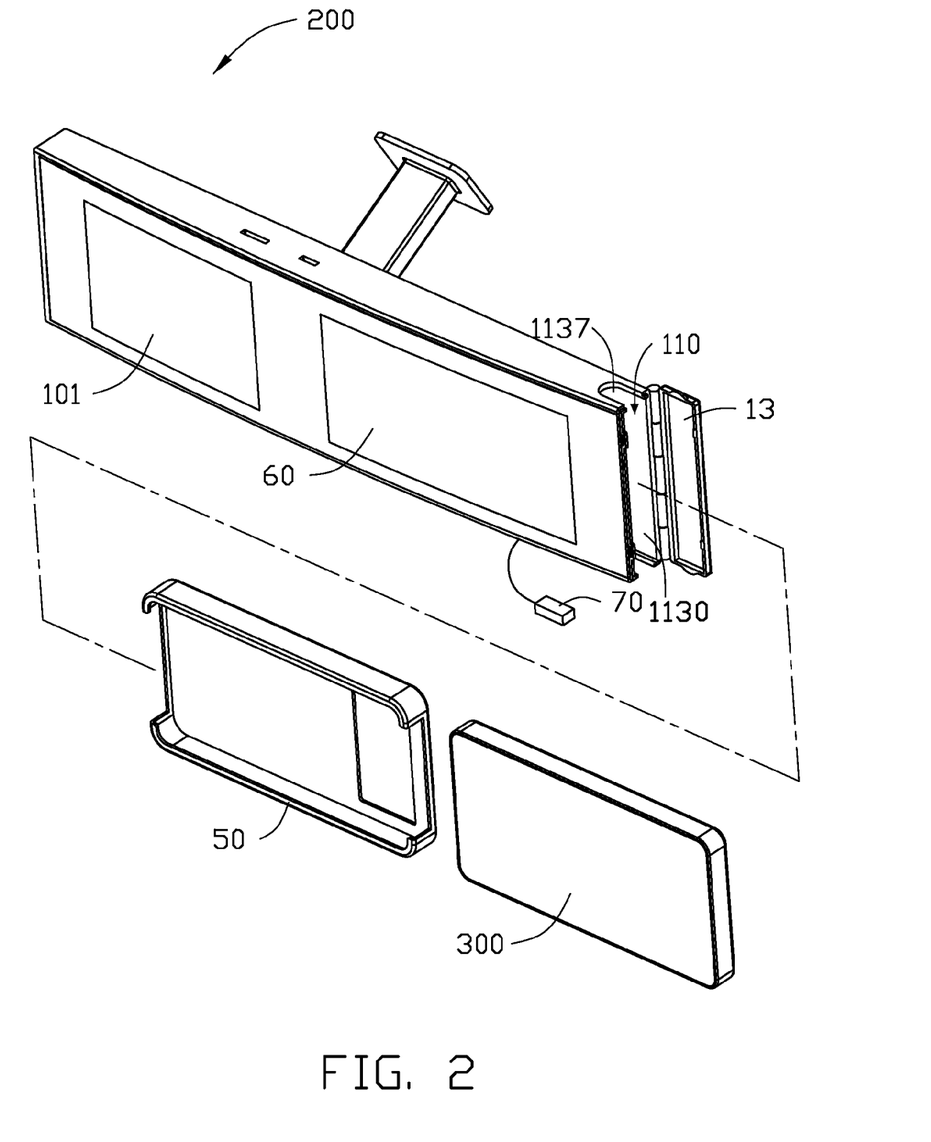
FIG. 2 is an exploded isometric view of the driving assistance device of FIG. 1.
Figure 3:
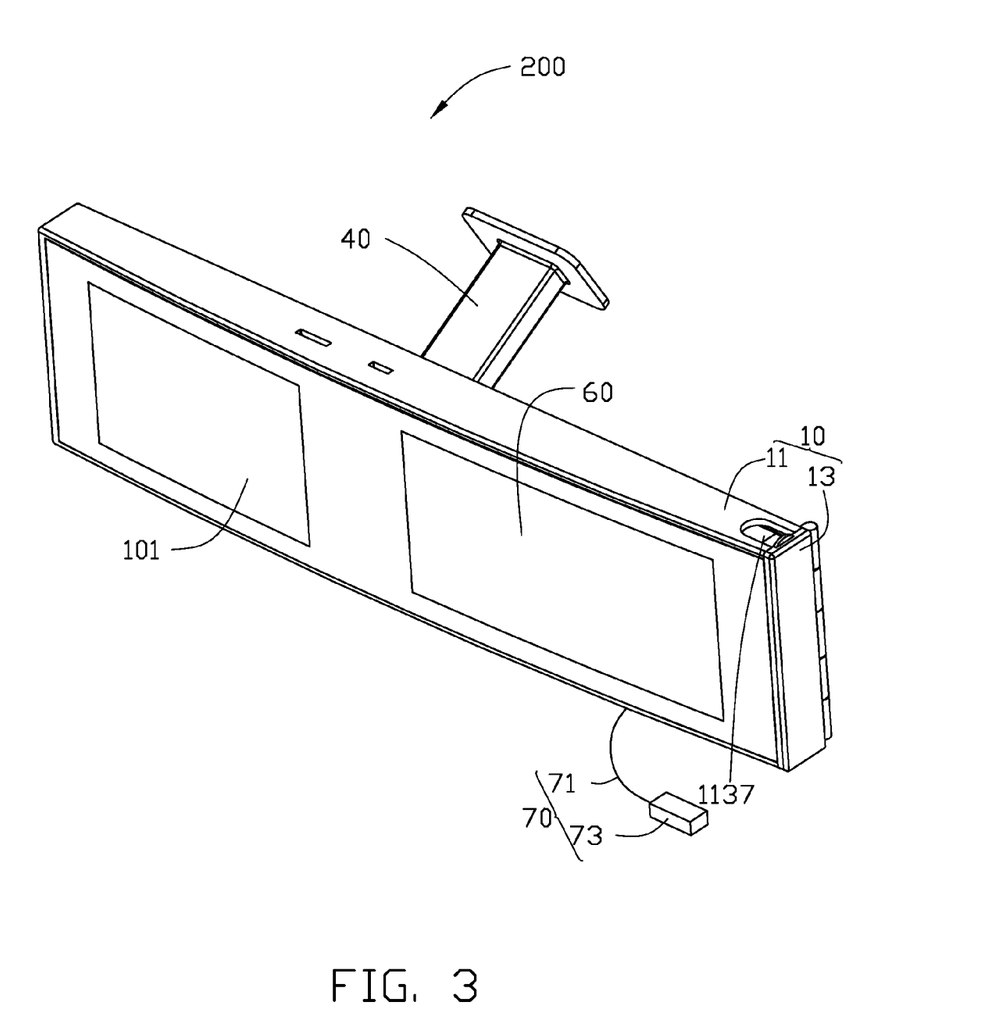
FIG. 3 is an assembled isometric view of the driving assistance device of FIG. 1.
Figure 4:
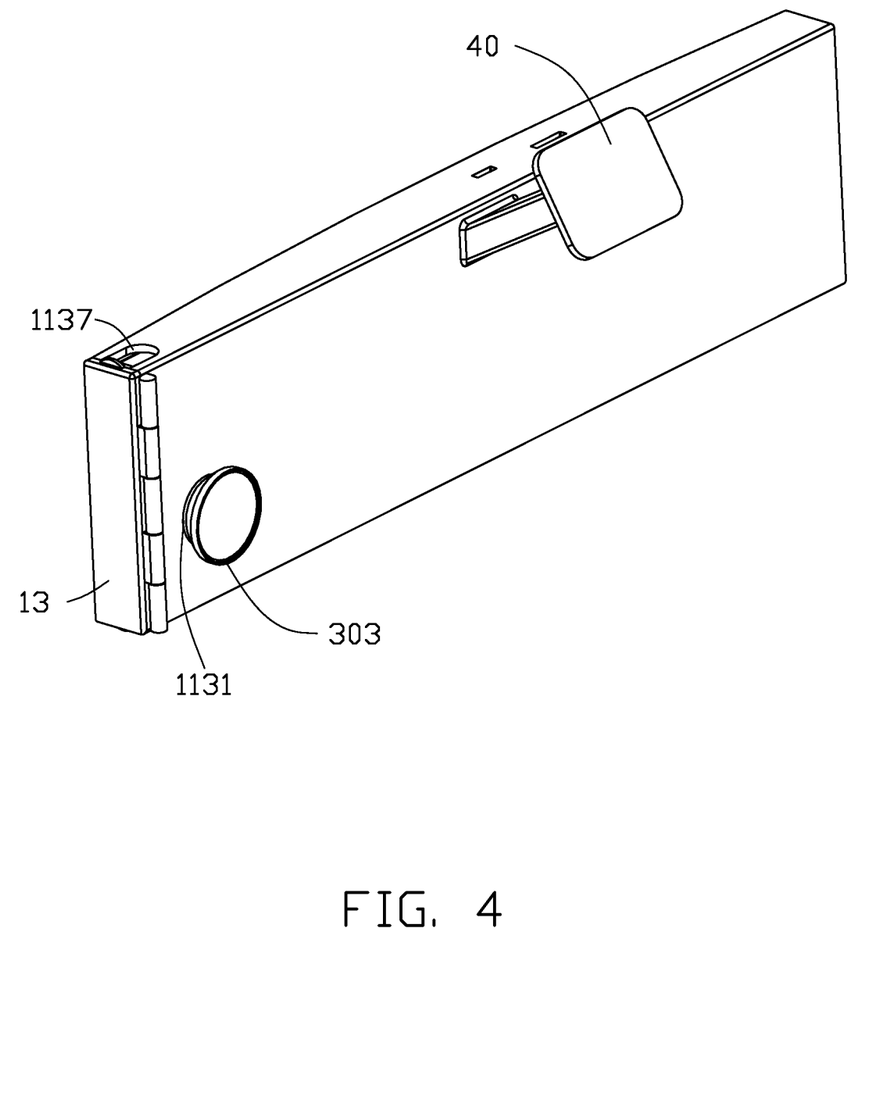
FIG. 4 is similar to FIG. 3, but the driving assistance device is viewed from another angle.

FIGS. 1 and 2 illustrate a vehicle 100 of the disclosure. The vehicle 100 can include a driving assistance device 200, a rear view mirror 101, and a front windshield 103. The driving assistance device 200 can be coupled to the front windshield 103 so as to face the driver of the vehicle. The rear view mirror 101 can be coupled to the driving assistance device 200. The driving assistance device 200 can be electrically coupled to a portable device 300. A driving assistance system 400 (see FIG. 7) including the driving assistance device 200 and the portable device 300 can simultaneously function as a driving monitor and driving navigation device. In at least one embodiment, the portable device 300 can be a smart-phone. The vehicle 100 also can include a steering wheel, a chassis, and other structures that are unrelated to the disclosure but necessary for the operation of the vehicle, the description of such structures being omitted.

FIGS. 3-6 illustrate that the driving assistance device 200 can include a housing 10, a plug connector 20, a controller 30 (see FIG. 7), a supporting bracket 40, a touch screen 60, a power line 70, an ejection member 80, and a pair of guiding assemblies 90. The housing 10 can be substantially a cubic shape, and can include a base 11, a bulkhead 12, and a cover 13 assembled to an end of the base 11. The base 11 can define a receiving chamber 110 therein and an opening 1130 at an end, the opening 1130 communicating with the receiving chamber 110. The bulkhead 12 can be received in the receiving chamber 110 and can divide the receiving chamber 110 into a first receiving portion 113 and a second receiving portion 114. The first receiving portion 113 can communicate with the opening 1130. The bulkhead 12 can define a pair of inserting holes 1121 therethrough. The first receiving portion 113 can include a bottom plate 115 and a pair of sidewalls 117 perpendicularly extending from opposite sides of the bottom plate 115. The bottom plate 115 can define a through hole 1131. The portable device 300 can be received in the first receiving portion 113 via the opening 1130, and aligned with the through hole 1131 for recording media (such as images, videos, voices) of the scene in front of the vehicle 300. In at least one embodiment, each sidewall 117 can define an operation cutout 1137 at an end communicating with the receiving chamber 110, for removal of the portable device 300 from the first receiving portion 113. The housing 10 can further define a sliding slot 1141 at a side communicating with the second receiving portion 114. The rear view mirror 101 can be assembled to a top of the second receiving portion 114. The cover 13 can be pivotably coupled to an end of the bottom plate 115 of base 11 adjacent to the first receiving portion 113. The cover 13 can cover the opening 1130 of the first receiving portion 113.

The plug connector 20 can be assembled to a side of the bulkhead 20 facing the first receiving portion 113. The plug connector 20 can be located between the pair of inserting holes 1121, and aligned to the opening 1130. The plug connector 20 can be configured for being electrically coupled to the portable device 300 and configured to interconnect the portable device 300 with the driving assistance device 200.

Figure 7:
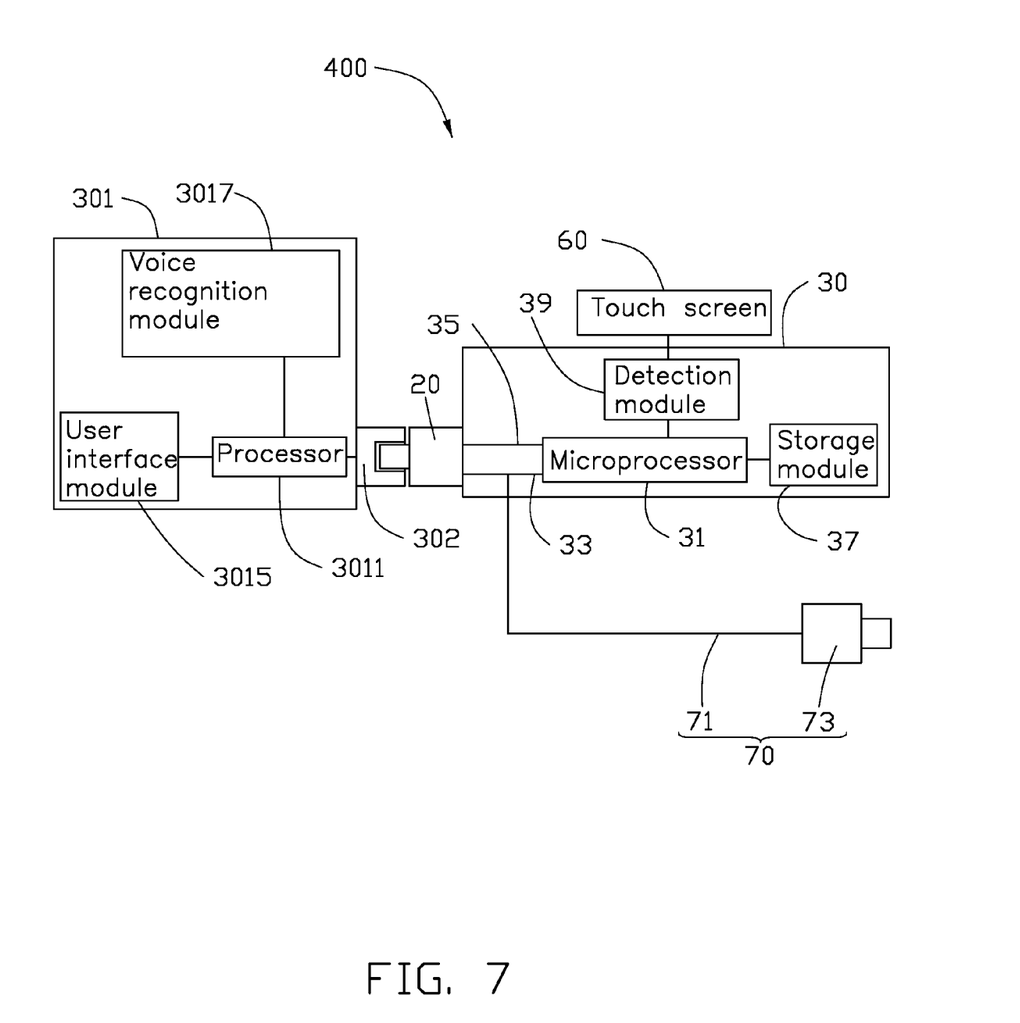
FIG. 7 is a block diagram of a driving assistance system utilized by the driving assistance device of FIG. 1.

The controller 30 (see FIG. 7) can be received in the second receiving portion 114, and can be electrically coupled to the plug connector 20. FIG. 7 illustrates that the controller 30 can include a microprocessor 31, a supply line 33, a signal line 35, a storage module 37, and a detection module 39. The microprocessor 31 can be electrically coupled to the plug connector 20 via the supply line 33 and the signal line 35 in order that the microprocessor 31 can exchange data with the portable device 300 via the signal line 35. The storage module 37 can be electrically coupled to the microprocessor 31 and can be configured for saving data received from the portable device 300. The detection module 39 can be electrically coupled to the microprocessor 31 and the touch screen 60 for detecting touches. When the detection module 39 detects a touch, the detection module 39 transfers the touch and any command related to the touch to the microprocessor 31, and the microprocessor 31 transfers the touch command to the portable device 300 via the plug connector 20, thereby controlling the portable device 300.

Referring to FIG. 3-6 again, the supporting bracket 40 can be secured to a bottom of the housing 10. An end of the supporting bracket 40 away from the housing 10 can be coupled to the front windshield 103 of the vehicle 100 for supporting the housing 10. In at least one embodiment, the supporting bracket 40 can be a suction cup.

The touch screen 60 can be assembled to a top of the first receiving portion 113, and located adjacent to the touch screen 60. The touch screen 60 and the rear view mirror 101 can be co-planar. The touch screen 60 can display images displayed on the portable device 300, and the portable device 300 can be operated via the touch screen 60.

Referring to FIG. 7, the power line 70 can be electrically coupled to the supply line 33 for supplying electrical power to the microprocessor 31 and the portable device 300. The power line 70 can include a conducting line 71 and a supply plug 73 electrically coupled to the conducting line 71. The conducting line 71 can be electrically coupled to the supply line 33. The supply plug 73 can be inserted into a cigarette lighter of the vehicle 100 to receive electrical power.

Referring to FIGS. 5 and 6 again, the ejection member 80 can be mounted in the second receiving portion 114 and adjacent to the sliding slot 1141. The ejection member 80 can slidably extend through the bulkhead 12 and be partially received in the first receiving portion 113. The ejection member 80 can include a first mounting portion 81, a second mounting portion 83, an operation portion 85, and a pair of ejection portions 87 protruding from a side of the first mounting portion 81. The operation portion 85 can protrude from a side of the second mounting portion 83. The second mounting portion 83 can substantially perpendicularly extend from the first mounting portion 81. The first mounting portion 81 and the second mounting portion 83 can be received in the first receiving portion 114. The first mounting portion 81 can be arranged parallel to the bulkhead 12. The second mounting portion 83 can be located adjacent to the sliding slot 1141. The operation portion 85 can be slidably received in the sliding slot 1141 and partially exposed out of the sliding slot 1141. The pair of ejection portions 87 can respectively extend though the pair of inserting holes 1121 and be partially received in the first receiving portion 113. When the operation member 80 is exerted to drive the first mounting portion 81 and the second mounting portion 83 toward the bulkhead 12, the pair of ejection portions 87 can move toward the first receiving portion 113 to urge the portable device 300 out of or away from the plug connector 20.

Figure 5:
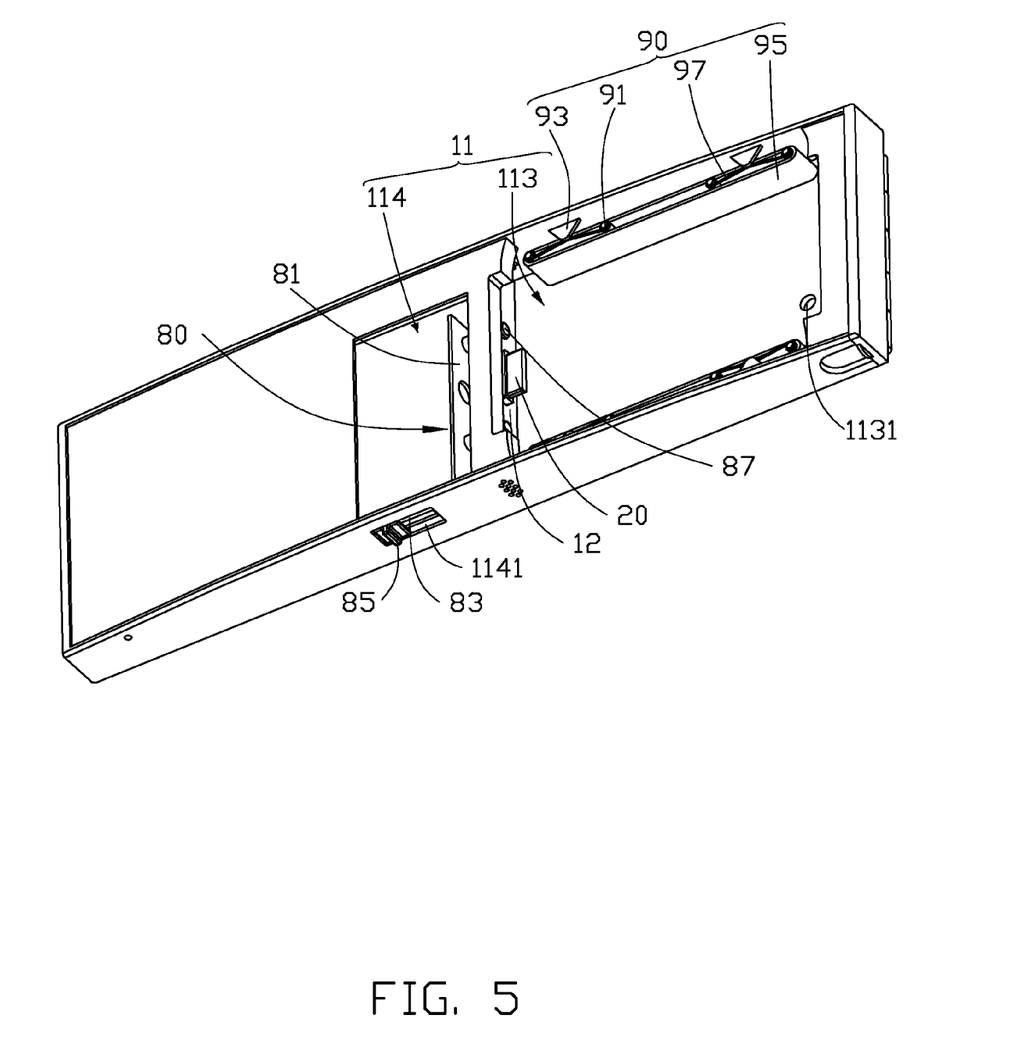
FIG. 5 is an isometric view of the partially removed driving assistance device of FIG. 3.
Figure 6:
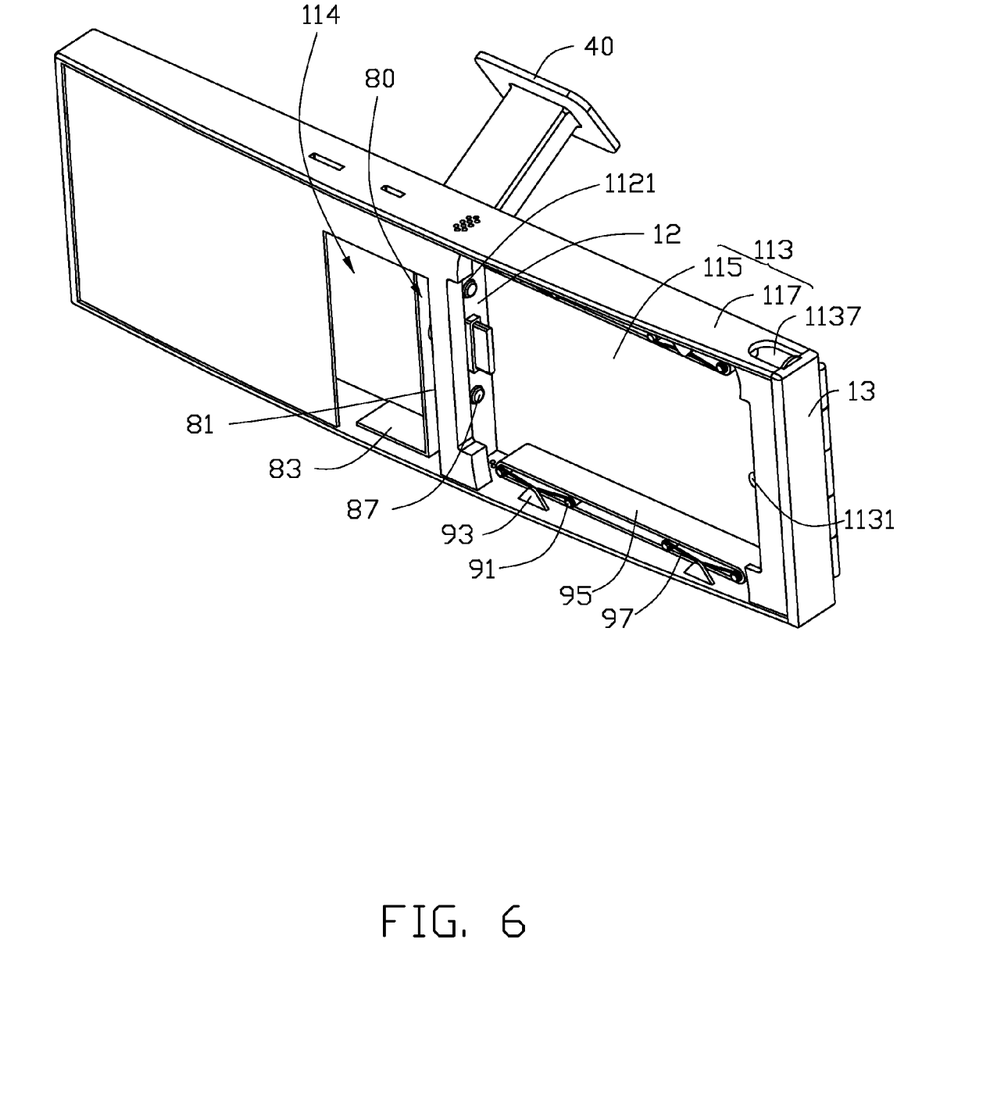
FIG. 6 is similar to FIG. 5, but the driving assistance device is viewed from another angle.

The pair of guiding assemblies 90 can be received in the first receiving portion 113 and respectively assembled to the pair of sidewalls 117. Each guiding assembly 90 can include four elastic rods 91, two fixing protrusions 93, a guiding belt 95, and two restriction members 97. The four elastic rods 91 can be assembled to the bottom plate 115 and respectively located adjacent to a sidewall 117. The four elastic rods 91 can be arranged in a line parallel to the sidewall 117, and spaced from each other. The four elastic rods 91 can be divided into two sets, the two fixing protrusions 93 can protrude from the sidewall 117 toward the other sidewall 117, and each fixing protrusion 93 can be located between two elastic rods 91 of each set. The guiding belt 95 can be sleeved on the four elastic rods 91. Opposite ends of each guiding belt 95 can be coupled to the two elastic rods 91 of one set, a middle portion of the guiding belt 95 can be coupled to the fixing protrusion 93 located between the two elastic rods 91. The portable device 300 can slide into the first receiving portion 113 along the pair of guiding belts 95. The four elastic rods 91 can be deformed to adapt to the portable device 300, the two restriction members 97 can restrict the deformation of the four elastic rods 91, thereby holding the portable device 300 via the two guiding belts 95.

The driving assistance device 200 can further include a protection case 50 sleeved on the portable device 300 to prevent the portable device from being impacted or damaged by the housing 10.

The portable device 300 can be received in the receiving chamber 110 and aligned to the touch screen 60. The portable device 300 can be releasably and electrically coupled to the plug connector 20. The portable device 300 can include a main body 301, a plug interface 302, and a camera (not shown). In at least one embodiment, the plug interface 302 and the camera can be assembled to the main body 301, the plug interface 302 can be a standard video input interface of the portable device 300, and the camera can be a rear-facing camera.

The main body 301 can be received in the first receiving portion 113 and aligned to the touch screen 60 to enable the camera to be aligned to the through hole 1131. The main body 301 can include a processor 3011, a user interface (UI) module 3015, and a voice recognition module 3017. The plug interface 302, the user interface module 3015, and the voice recognition module 3017 can be electrically coupled to the processor 3011. When the plug connector 20 is inserted into the plug interface 302, the processor 3011 makes a recognition request to the microprocessor 31, the microprocessor 31 can accept the request and establish a connection between the processor 3011 and the microprocessor 31. Simultaneously, the microprocessor 31 can make a request for an audio signal from the portable device 300. The processor 3011 can accept the audio request and transfers an audio connection to the microprocessor 31. Driving assistance software downloaded from internet can be installed in the portable device 300, and the processor 3011 can be capable of controlling the driving assistance software.

In at least one embodiment, the driving assistance software can include (but is not necessary limited to) driving recording software, and navigation software, for example. The driving assistance software can be capable of recording media (such as images, videos, voices) in front of the vehicle 100 via the camera, and record sounds within the vehicle 100 via the audio recording components of the portable device 300. The processor 3011 transfers the recordings of the media (such as images, videos, voices) and the audio signals to the microprocessor 31. The microprocessor 31 transfers recordings to the storage module 37 to be saved. The navigation software obtains navigation signals such as current geographic coordinates of the vehicle 100 and navigation data of environment via global positioning system (GPS). The processor 3011 transfers the navigation signals to the microprocessor 31 to enable the touch screen 60 to display the navigation signals or a map image based thereon. When the voice recognition module 3017 identifies a voice command from a user, it sends the command to the processor 3011, the processor 3011 starts assistance software to execute actions according to the voice command and controls the user interface module 3015 to display image which displayed on the assistance software.

The plug connector 20 can be inserted into the plug interface 302, therefore the portable device 300 transfers signals to the microprocessor 31 via the signal line 35, and obtains electricity from the power line 70 via the supply line 33. When user touches the touch screen 60, the detection module 39 detects a touch command on the touch screen 60, transfers the touch command to the microprocessor 31, and finally transfers the command to the processor 3011 of the portable device 300 via the plug connector 20. The processor 3011 controls user interface module 3015 to display driving assistance software. Simultaneously, the processor 3011 sends signals to the microprocessor 31, then the microprocessor 31 controls the touch screen 60 to repeat the images displayed on the portable device 300. The camera can be positioned on the through hole 1131 to record media (such as images, videos, voices) of the scene in front of the vehicle 100. In at least one embodiment, the driving assistance device 200 further can include a wide angle lens 303 mounted on the housing 11 and aligned to the through hole 1131, therefore, an angle of vision of the camera of the portable device 200 can be broadened.

The supply plug 73 can be inserted into the cigarette lighter of the vehicle 100 to get electricity, and the electricity transferred to the microprocessor 31 and the plug connector 20. The portable device 300 slides along the two guiding assemblies 90 into the first receiving portion 113. The plug connector 20 can be inserted into the plug interface 302, and the supply line 33 can charge a battery of the portable device 300.

When unfolding the driving assistance device 200, the cover 13 can be rotated to open, the operation portion 85 can be moved along the sliding slot 1141, the two ejection portions 87 move toward the first receiving portion 113 and push against the portable device 200. A user can remove the portable device 200 out of the housing 10 via the opening 1130.

The detection module 39 can be omitted. When user uses only touch to control the portable device 300 directly to accomplish the recording of sounds and images, and obtains the navigation information, the voice recognition module 3017 and the touch screen 60 can be omitted. If the housing 10 can be directly assembled to the front windshield 103, the supporting bracket 40 can be omitted. The number of the inserting holes 1121 can be changed according to requirements, such as one or three, the number of the ejection protrusions 87 can be equal to the number of the inserting holes 1121. The number of the guiding assemblies 90, of the fixing protrusions 93, and of the elastic rods 91 can be changed according to requirements.

While the present disclosure has been described with reference to particular embodiments, the description is illustrative of the disclosure and is not to be construed as limiting the disclosure. Therefore, those of ordinary skill in the art can make various modifications to the embodiments without departing from the true spirit and scope of the disclosure, as defined by the appended claims.

What is claimed is:

1. A driving assistance device for a portable device detachably coupled thereto, the driving assistance device comprising:
   a housing defining a receiving chamber therein and an opening at an end communicating with the receiving chamber, and the housing comprising a bulkhead assembled in the receiving chamber to divided the receiving chamber into a first receiving portion and a second receiving portion, the first receiving portion communicating with the opening and configured for receiving the portable device;
   a plug connector assembled to the bulkhead and aligned to the opening, the plug connector being configured for releasably and electrically coupled to the portable device;
   a controller received in the second receiving portion and electrically coupled to the plug connector, the controller being configured for exchanging data with the portable device via the plug connector; and
   an ejection member slidably received in the second receiving portion and partially received in the first receiving portion, and the ejection member being capable of pushing the portable device to depart from the plug connector.

2. The driving assistance device of claim 1, wherein the controller comprises a microprocessor, a supply line, a signal line, and a storage module electrically coupled to the microprocessor, the plug connector is electrically coupled to the microprocessor via the supply line and the signal line, the driving assistance device further comprises a power line electrically coupled to the supply line, the plug connector charges the portable device, the microprocessor is configured to exchange signal data with the portable device via the signal line and the plug connector, transfer the signal data to the storage module to be saved; and capable of receiving electrical power from the power line.

3. The driving assistance device of claim 1, wherein the bulkhead defines at least one inserting hole, the ejection member comprises a first mounting portion, a second mounting portion perpendicularly extending from an end of the first mounting portion, and at least one ejection portion protruding from a side of the first mounting portion, the first mounting portion is arranged parallel to the bulkhead, the second mounting portion is located adjacent to an inner side of the second receiving portion, the at least one ejection portion slidably extends through the at least one inserting hole and partially protrudes into the first receiving portion to push the portable device.

4. The driving assistance device of claim 3, wherein the ejection member further comprises an operation portion protruding from a side of the second mounting portion, the second receiving portion defines a sliding slot at a side of the housing, the operation portion is slidably received in the sliding slot and partially exposes out of the sliding slot.

5. The driving assistance device of claim 1, wherein the first receiving portion comprises a bottom plate and a pair of sidewalls perpendicularly extending from opposite sides of the bottom plate, the driving assistance device further comprises a pair of guiding assemblies respectively assembled to the pair of sidewalls, each guiding assembly comprises at least two elastic rods, one fixing protrusion, one guiding belt, and two restriction members, the at least two elastic rods are assembled to the bottom plate, and each of the at least two elastic rods is located adjacent to one of the sidewalls, the at least one fixing protrusion protrudes from an inner side of one sidewall located between the at least two elastic rods, the at least one guiding belt is sleeved on the at least two elastic rods, opposite ends of the at least one restriction member are coupled to the at least two elastic rods, and a middle portion of the at least one restriction member is coupled to the at least one fixing protrusion.

6. The driving assistance device of claim 5, the housing further comprises a cover pivotably coupled to an end of the bottom plate and seals the opening.

7. The driving assistance device of claim 2, the power line comprises a conducting line and a supply plug electrically coupled to the conducting line, the conducting line is electrically coupled to the supply line, the supply plug is configured for inserting into a cigarette lighter of a vehicle to obtain electrical power for charging the portable device.

8. A driving assistance device configured to be detachably coupled to a portable device, the driving assistance device comprising:
   a housing defining a receiving chamber therein and an opening at an end of the housing, the housing comprising a bulkhead dividing the receiving chamber into a first receiving portion and a second receiving portion, wherein first receiving portion is configured to receive the portable device;

a plug connector coupled to the bulkhead and aligned to the opening, the plug connector configured to be releasably and electrically coupled to the portable device;

a controller configured to be received in the second receiving portion and electrically coupled to the plug connector, the controller configured to exchange data with the portable device via the plug connector; and an ejection member configured to be slideably received in the second receiving portion and configured to be partially received in the first receiving portion, the ejection member being configured to push the portatable device away from the plug connector.

9. The driving assistance device of claim 8, wherein the controller comprises a microprocessor, a supply line, a signal line, and a storage module electrically coupled to the microprocessor, the plug connector is electrically coupled to the microprocessor via the supply line and the signal line, the driving assistance device further comprises a power line electrically coupled to the supply line, the plug connector charges the portable device, the microprocessor is configured to exchange signal data with the portable device via the signal line and the plug connector, transfer the signal data to the storage module to be saved; and capable of receiving electrical power from the power line.

10. The driving assistance device of claim 8, wherein the bulkhead defines at least one inserting hole, the ejection member comprises a first mounting portion, a second mounting portion perpendicularly extending from an end of the first mounting portion, and at least one ejection portion protruding from a side of the first mounting portion, the first mounting portion is arranged parallel to the bulkhead, the second mounting portion is located adjacent to an inner side of the second receiving portion, the at least one ejection portion slidably extends through the at least one inserting hole and partially protrudes into the first receiving portion to push the portable device.

11. The driving assistance device of claim 10, wherein the ejection member further comprises an operation portion protruding from a side of the second mounting portion, the second receiving portion defines a sliding slot at a side, the operation portion is slidably received in the sliding slot and partially exposes out of the sliding slot.

* * * * *